US010049299B2

(12) United States Patent
Chen et al.

(10) Patent No.: US 10,049,299 B2
(45) Date of Patent: Aug. 14, 2018

(54) DEEP LEARNING BASED METHOD AND APPARATUS FOR THREE DIMENSIONAL MODEL TRIANGULAR FACET FEATURE LEARNING AND CLASSIFYING

(71) Applicant: BEIHANG UNIVERSITY, Beijing (CN)

(72) Inventors: Xiaowu Chen, Beijing (CN); Kan Guo, Beijing (CN); Dongqing Zou, Beijing (CN); Qinping Zhao, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 29 days.

(21) Appl. No.: 15/439,896

(22) Filed: Feb. 22, 2017

(65) Prior Publication Data
US 2018/0101752 A1    Apr. 12, 2018

(30) Foreign Application Priority Data
Oct. 11, 2016    (CN) .......................... 2016 1 0889177

(51) Int. Cl.
*G06K 9/00*    (2006.01)
*G06K 9/62*    (2006.01)
(Continued)

(52) U.S. Cl.
CPC ......... *G06K 9/6232* (2013.01); *G06K 9/6268* (2013.01); *G06N 3/04* (2013.01); *G06N 3/08* (2013.01)

(58) Field of Classification Search
None
See application file for complete search history.

(56) References Cited

U.S. PATENT DOCUMENTS 9,424,492 B2 *    8/2016    Murray ................. G06K 9/629
2005/0228591 A1 *  10/2005    Hur .................... G06K 9/6215
                                                              702/19
(Continued)

OTHER PUBLICATIONS

Zhenyu Shu et al., "Unsupervised 3D shape segmentation and co-segmentation via deep learning" Computer Aided Geometric Design, vol. 43, (Mar. 2016), pp. 39-52.

*Primary Examiner* — Hadi Akhavannik
(74) *Attorney, Agent, or Firm* — J.C. Patents

(57) ABSTRACT

The invention discloses a deep learning based method for three dimensional (3D) model triangular facet feature learning and classifying and an apparatus. The method includes: constructing a deep convolutional neural network (CNN) feature learning model; training the deep CNN feature learning model; extracting a feature from, and constructing a feature vector for, a 3D model triangular facet having no class label, and reconstructing a feature in the constructed feature vector using a bag-of-words algorithm; determining an output feature corresponding to the 3D model triangular facet having no class label according to the trained deep CNN feature learning model and an initial feature corresponding to the 3D model triangular facet having no class label; and performing classification. The method enhances the capability to describe 3D model triangular facets, thereby ensuring the accuracy of 3D model triangular facet feature learning and classifying results.

10 Claims, 8 Drawing Sheets

(51) Int. Cl.
*G06N 3/04* (2006.01)
*G06N 3/08* (2006.01)

(56) References Cited

U.S. PATENT DOCUMENTS

2010/0172567 A1* 7/2010 Prokoski .............. A61B 5/0064
                                                382/132
2012/0136860 A1* 5/2012 Regli ................ G06F 17/30542
                                                707/737
2016/0098619 A1* 4/2016 Gaidon ................ G06K 9/6212
                                                382/159

* cited by examiner

DEEP LEARNING BASED METHOD AND APPARATUS FOR THREE DIMENSIONAL MODEL TRIANGULAR FACET FEATURE LEARNING AND CLASSIFYING

CROSS-REFERENCE TO RELATED APPLICATIONS

This application claims priority to Chinese Patent Application No. 201610889177.0, filed on Oct. 11, 2016 and entitled "DEEP LEARNING BASED METHOD AND APPARATUS FOR THREE DIMENSIONAL MODEL TRIANGULAR FACET FEATURE LEARNING AND CLASSIFYING", which is hereby incorporated by reference in its entirety.

TECHNICAL FIELD

The present invention relates to computer technologies, and particularly to a deep learning based method for three dimensional model triangular facet feature learning and classifying and an apparatus.

BACKGROUND

As science and technology of our society continue to progress, three dimensional (3D) technologies have become an important component of modern science and technology. The 3D model triangular facet feature learning and classifying technology, which is one of the fundamental techniques in 3D model interpretation and processing, plays a huge role in 3D modeling, 3D animation, 3D mapping and many other 3D technology fields.

In prior arts, various 3D model triangular facet feature learning and classifying techniques have been proposed. For example, Zhenyu Shu et al. of Zhejiang University proposed an unsupervised and deep learning based method for classifying and co-segmenting 3D model triangular facets in 2016. The method involves extracting 3D model features on the basis of pre-segmentation, reconstructing and learning the features using a deep learning model auto-encoder under the condition of non-supervision, and obtaining classifying and co-segmenting result for the 3D model triangular facets by clustering the output features using a Gaussian mixture model (GMM). Yet, by employing an unsupervised feature learning manner, said method fails to guarantee that correct output feature is obtained via the learning, nor that accurate triangular facet classifying result is obtained.

In view of the above, features extracted in prior art have insufficient capability to describe the triangular facets, leading to inaccurate results of 3D model triangular facet feature learning and classifying.

SUMMARY

The present invention provides a deep learning based method for 3D model triangular facet feature learning and classifying and an apparatus.

In a first aspect of the present invention, there is provided a deep learning based method for 3D model triangular facet feature learning and classifying, including:
constructing a deep convolutional neural network (CNN) feature learning model having a first convolution layer, a first downs ampling layer, a second convolution layer and a second downsampling layer, where the first convolution layer has 16 convolution kernels, each of which has a dimension of 5×5, a scaling factor of the first downsampling layer is 2, the second convolution layer has 16×20 convolution kernels, each of which has a dimension of 3×3, and a scaling factor of the second downsampling layer is 2;
extracting a feature from a 3D model triangular facet having a class label and constructing a feature vector for the 3D model triangular facet having the class label, and reconstructing a feature in the constructed feature vector using a bag-of-words algorithm to obtain an initial feature corresponding to the 3D model triangular facet having the class label;
training the deep CNN feature learning model using the initial feature corresponding to the 3D model triangular facet having the class label to obtain a trained deep CNN feature learning model;
extracting a feature from a 3D model triangular facet having no class label and constructing a feature vector for the 3D model triangular facet having no class label, and reconstructing a feature in the constructed feature vector using the bag-of-words algorithm to obtain an initial feature corresponding to the 3D model triangular facet having no class label;
determining an output feature corresponding to the 3D model triangular facet having no class label according to the trained deep CNN feature learning model and the initial feature corresponding to the 3D model triangular facet having no class label; and
classifying the 3D model triangular facet having no class label according to the output feature corresponding to the 3D model triangular facet having no class label.

Further, the extracting a feature from a 3D model triangular facet having a class label and constructing a feature vector for the 3D model triangular facet having the class label, and reconstructing a feature in the constructed feature vector using a bag-of-words algorithm to obtain an initial feature corresponding to the 3D model triangular facet having the class label includes:
calculating a curvature feature, a shape feature, a distance feature, a context feature and a main component feature of the 3D model triangular facet having the class label;
clustering, according to the curvature feature, the shape feature, the distance feature, the context feature and the main component feature of the 3D model triangular facet having the class label, each class of features of the 3D model triangular facet having the class label using a K-means algorithm to obtain K clustering centers, where K is an integer greater than 0;
subtracting a feature of each of the clustering centers from a feature of each 3D model triangular facet having a class label and performing a nonlinear transformation, summing K new features resulted from the transformation, and dividing the sum by K to obtain an average feature value of each 3D model triangular facet having a class label;
determining a neighboring facet of each 3D model triangular facet having a class label;
multiplying the average feature value of each 3D model triangular facet having a class label by an average feature value of the neighboring facet and performing a summing operation, and taking the result of the operation as the initial feature corresponding to the 3D model triangular facet having the class label; and
performing normalizing calculation for the initial feature corresponding to the 3D model triangular facet having the class label.

Further, the training the deep CNN feature learning model using the initial feature corresponding to the 3D model triangular facet having the class label to obtain a trained deep CNN feature learning model includes:

A, inputting the initial feature corresponding to the 3D model triangular facet having the class label into the deep CNN feature learning model, and obtaining a probability of each 3D model triangular facet having a class label belonging to each class by calculating layer-by-layer;

B, obtaining a residual error by subtracting a class label data that each 3D model triangular facet having a class label has from the obtained probability of each 3D model triangular facet having a class label belonging to each class and performing a square operation;

C, obtaining, according to the residual error, a partial derivative for a parameter of each layer by starting from a last layer of the deep CNN feature learning model and moving forward layer-by-layer, and updating the parameter of each layer by moving layer-by-layer; and D, looping from A to C until reaching a predefined number of loops.

Further, the classifying the 3D model triangular facet having no class label according to the output feature corresponding to the 3D model triangular facet having no class label includes:

performing weighting and offset calculating for the output feature corresponding to the 3D model triangular facet having no class label;

obtaining an activation value by activating a result of the weighting and offset calculating using a nonlinear function; and solving a classification probability according to the activation value.

Further, the method further includes:

determining a boundary 3D model triangular facet having no class label; and optimizing, according to a classification result of the 3D model triangular facet having no class label and the determined boundary 3D model triangular facet having no class label, the classification result using a Fuzzycuts algorithm.

In a second aspect of the present invention, there is provided a deep learning based apparatus for 3D model triangular facet feature learning and classifying, including:

a constructing module, configured to construct a deep CNN feature learning model having a first convolution layer, a first downsampling layer, a second convolution layer and a second downsampling layer, where the first convolution layer has 16 convolution kernels, each of which has a dimension of 5×5, a scaling factor of the first downsampling layer is 2, the second convolution layer has 16×20 convolution kernels, each of which has a dimension of 3×3, and a scaling factor of the second downsampling layer is 2;

a first reconstructing module, configured to extract a feature from a 3D model triangular facet having a class label and construct a feature vector for the 3D model triangular facet having the class label, and reconstruct a feature in the constructed feature vector using a bag-of-words algorithm to obtain an initial feature corresponding to the 3D model triangular facet having the class label;

a training module, configured to train the deep CNN feature learning model using the initial feature corresponding to the 3D model triangular facet having the class label to obtain a trained deep CNN feature learning model;

a second reconstructing module, configured to extract a feature from a 3D model triangular facet having no class label and construct a feature vector for the 3D model triangular facet having no class label, and reconstruct a feature in the constructed feature vector using the bag-of-words algorithm to obtain an initial feature corresponding to the 3D model triangular facet having no class label;

a first determining module, configured to determine an output feature corresponding to the 3D model triangular facet having no class label according to the trained deep CNN feature learning model and the initial feature corresponding to the 3D model triangular facet having no class label; and a classifying module, configured to classify the 3D model triangular facet having no class label according to the output feature corresponding to the 3D model triangular facet having no class label.

Further, the first reconstructing module includes:

a calculating unit, configured to calculate a curvature feature, a shape feature, a distance feature, a context feature and a main component feature of the 3D model triangular facet having a class label;

a clustering unit, configured to cluster, according to the curvature feature, the shape feature, the distance feature, the context feature and the main component feature of the 3D model triangular facet having the class label, each class of features of the 3D model triangular facet having the class label using a K-means algorithm to obtain K clustering centers, where K is an integer greater than 0;

an obtaining unit, configured to subtract a feature of each of the clustering centers from a feature of each 3D model triangular facet having a class label and perform a nonlinear transformation, sum K new features resulted from the transformation, and divide the sum by K to obtain an average feature value of each 3D model triangular facet having a class label;

a determining unit, configured to determine a neighboring facet of each 3D model triangular facet having a class label;

an operation unit, configured to multiply the average feature value of each 3D model triangular facet having a class label by an average feature value of the neighboring facet and perform a summing operation, and take a result of the operation as the initial feature corresponding to the 3D model triangular facet having the class label; and a normalizing unit, configured to perform normalizing calculation for the initial feature corresponding to the 3D model triangular facet having the class label.

Further, the training module includes:

a first calculating unit, configured to input the initial feature corresponding to the 3D model triangular facet having the class label into the deep CNN feature learning model, and obtain a probability of each 3D model triangular facet having a class label belonging to each class by calculating layer-by-layer;

a second calculating unit, configured to obtain a residual error by subtracting a class label data that each 3D model triangular facet having a class label has from the obtained probability of each 3D model triangular facet having a class label belonging to each class, and perform a square operation; and a third calculating unit, configured to obtain, according to the residual error, a partial derivative for a parameter of each layer by starting from a last layer of the deep CNN feature learning model and moving forward layer-by-layer, and update the parameter of each layer by moving layer-by-layer.

Further, the classifying module includes:

a fourth calculating unit, configured to perform weighting and offset calculating for the output feature corresponding to the 3D model triangular facet having no class label;

a fifth calculating unit, configured to obtain an activation value by activating a result of the weighting and offset calculating using a nonlinear function; and a sixth calculating unit, configured to solve a classification probability according to the activation value.

Further, the apparatus further includes:

a second determining module, configured to determine a boundary 3D model triangular facet having no class label; and an optimizing module, configured to optimize, according to a classification result of the 3D model triangular facet having no class label and the determined boundary 3D model triangular facet having no class label, the classification result using a Fuzzycuts algorithm.

According to the method herein, before training the deep CNN feature learning model and inputting the 3D model triangular facet features into the deep CNN feature learning model, the 3D model triangular facet features will be extracted and reconstructed, which enhances the capability to describe the 3D model triangular facets. And on this basis, a deep CNN feature learning model having a specific structure is combined to perform feature processing and classifying, thereby ensuring the accuracy of 3D model triangular facet feature learning and classifying results.

BRIEF DESCRIPTION OF DRAWINGS

A brief introduction will be given hereinafter to the accompany drawings which will be used in the description of embodiments or prior art in order to explain the technical solutions of the present invention or prior art more clearly. Apparently, the drawings in the description below are merely illustrating some embodiments of the present invention. Those skilled in the art may obtain other drawings according to these drawings without paying any creative effort.

DESCRIPTION OF EMBODIMENTS

In order to make objectives, technical solutions and advantages of the present invention clearer, the technical solutions in embodiments of the present invention will be described hereunder clearly and comprehensively with reference to accompanying drawings in the embodiments of the present invention. Obviously, the described embodiments are only a part of embodiments of the present invention, rather than all of them. Any other embodiments obtained by persons skilled in the art based on the embodiments of the present invention herein without making any creative effort shall fall into the protection scope of the present invention.

Figure 1:
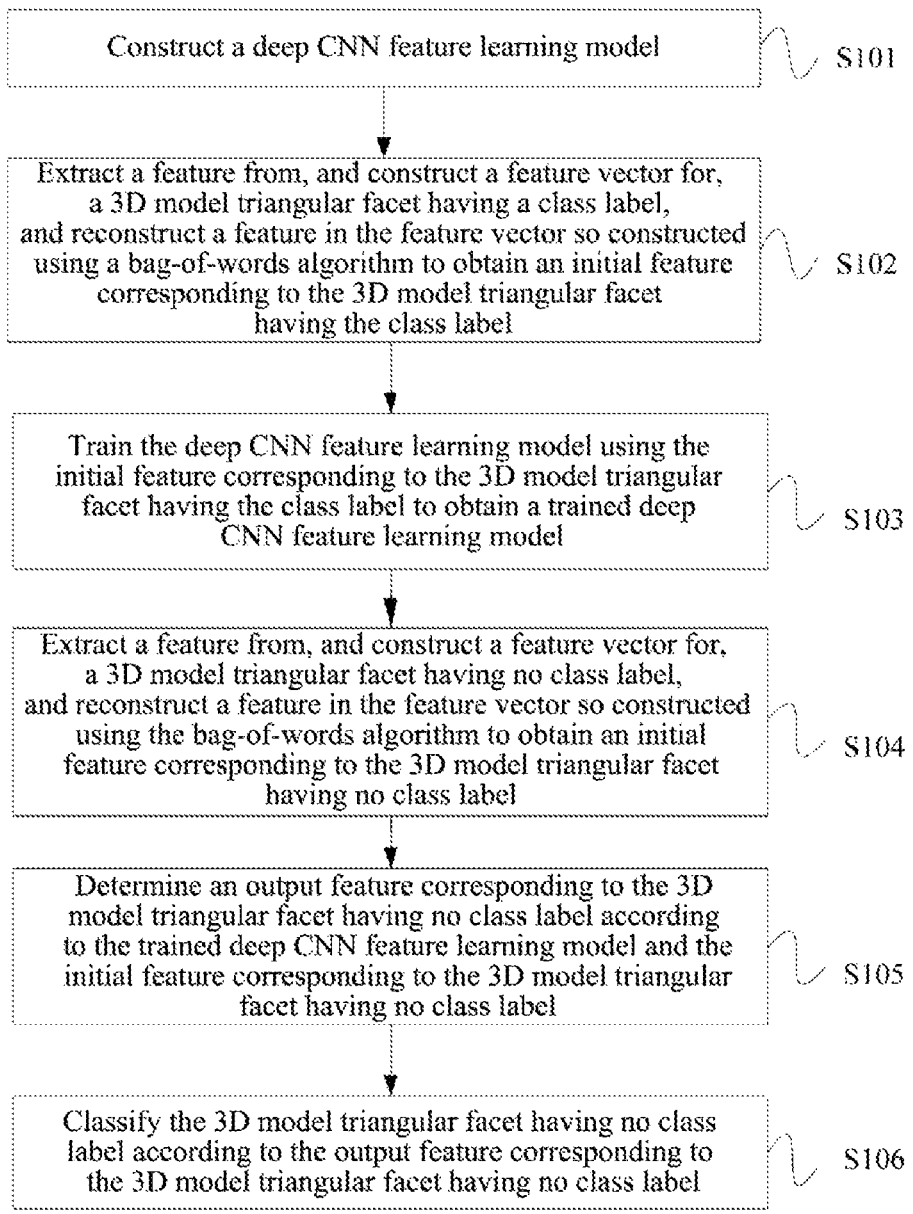
FIG. 1 is a flowchart illustrating a first embodiment of a deep learning based method for 3D model triangular facet feature learning and classifying provided herein.

FIG. 1 is a flowchart illustrating a first embodiment of a deep learning based method for 3D model triangular facet feature learning and classifying provided herein. As depicted in FIG. 1, the method includes:

S101: construct a deep CNN feature learning model.

Figure 2:
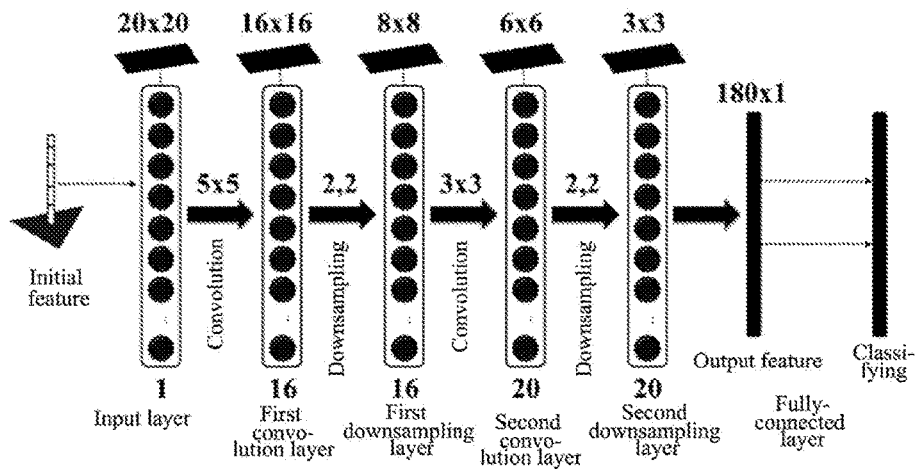
FIG. 2 is a schematic diagram illustrating a deep CNN feature learning model.

FIG. 2 is a schematic diagram illustrating a deep CNN feature learning model. As depicted in FIG. 2, the deep CNN feature learning model has a first convolution layer, a first downsampling layer, a second convolution layer and a second downsampling layer, where the first convolution layer has 16 convolution kernels, each of which has a dimension of 5×5, a scaling factor of the first downsampling layer is 2, the second convolution layer has 16×20 convolution kernels, each of which has a dimension of 3×3, and a scaling factor of the second downsampling layer is 2.

Now the processing performed by the deep CNN feature learning model is described.

Referring to FIG. 2, the deep CNN feature learning model herein is mainly divided into six layers, with the first layer being an input layer, the second layer being a convolution layer having 16 convolution kernels, each of which has the dimension of 5×5, i.e. the first convolution layer. Assuming that $W_i$ represents a weight for a convolution kernel, the convolutional operation is defined as:

$$\text{Output}_i = W_i * \text{Input} + b_i, i = 1\text{K } 16$$

where * represents the convolutional operation, and $b_i$ represents an offset vector. By performing the convolutional operation for an input initial feature using the 16 convolution kernels, 16 features, each of which has a dimension of 16×16, are obtained and then activated using a sigmoid activation function as the following:

$$\text{Output}' = \text{sigmoid (Output)} = \frac{1}{1 + \exp^{-\text{Output}}}$$

Further, the features which have gone through the non-linear transformation and activation operation are downsampled with a scaling factor of 2 at the third layer, i.e. the first downsampling layer, producing 16 features, each of which has a dimension of 8×8, as the input of the fourth layer.

Figure 3:
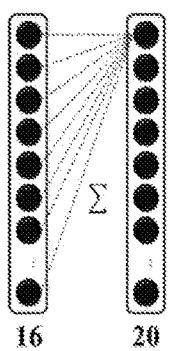
FIG. 3 is a schematic diagram illustrating the processing on the fourth layer.

Further, the 16 features outputted from the third layer are expanded into 20 new features, each of which has a dimension of 6×6, at the fourth layer, i.e. the second convolution layer. FIG. 3 is a schematic diagram illustrating the processing on the fourth layer. As depicted in FIG. 3, each new feature is solved by performing convolutional operation and accumulative operation on the 16 output features of the third layer using a convolution layer constructed by 16 convolution kernels, each of which has a dimension of 3×3.

Further, the features thus produced are activated and down-sampled at the fifth layer, i.e. the second downsampling layer, producing 20 features, each of which has a dimension of 3×3.

Further, the features outputted from the fifth layer are reconstructed into a feature vector of a dimension 180×1 at the sixth layer, i.e. a fully-connected layer. For the purpose of normalizing the output features into the range of [0,1] , the nonlinear mapping is utilized again and the sigmoid activation function is used again for performing the activation operation thereon, thus obtaining the probability $P_t$ of each 3D model triangular facet belonging to a different class.

S102: extract a feature from, and construct a feature vector for, a 3D model triangular facet having a class label, and reconstruct a feature in the feature vector so constructed using a bag-of-words algorithm to obtain an initial feature corresponding to the 3D model triangular facet having the class label.

S103: train the deep CNN feature learning model using the initial feature corresponding to the 3D model triangular facet having the class label to obtain a trained deep CNN feature learning model.

Steps S102-S103 form the process of training the deep CNN feature learning model. Step S102 begins by extracting and reconstructing a feature for a 3D model triangular facet that already has a class label, and takes the reconstructed feature as the input of the deep CNN feature learning model.

Further, in step S103, the deep CNN feature learning model is trained.

S104: extract a feature from, and construct a feature vector for, a 3D model triangular facet having no class label, and reconstruct a feature in the feature vector so constructed using the bag-of-words algorithm to obtain an initial feature corresponding to the 3D model triangular facet having no class label.

S105: determine an output feature corresponding to the 3D model triangular facet having no class label according to the trained deep CNN feature learning model and the initial feature corresponding to the 3D model triangular facet having no class label.

S106: classify the 3D model triangular facet having no class label according to the output feature corresponding to the 3D model triangular facet having no class label.

Steps S104-S106 form the process of classifying the 3D model triangular facet using the trained deep CNN feature learning model. The step S104 herein is about extracting and reconstructing a feature of a 3D model triangular facet in a way similar to that of S102, which will be detailed later.

In step S105, the initial feature produced after the calculation in S104 is inputted into the trained deep CNN feature learning model. The deep CNN feature learning model will then output a corresponding output feature, where the processing of the initial feature in the CNN feature learning model may be understood by referring to the processing performed by the deep CNN feature learning model in the aforementioned step S101, which will not be repeated herein.

In step S106, the 3D model triangular facet is classified according to the output feature of the deep CNN feature learning model.

The present embodiment begins from constructing and training the deep CNN feature learning model having a specific structure, proceeds to obtaining output features of the 3D model triangular facet to be classified using the trained deep CNN feature learning model, and then classifies the 3D model triangular facet based on these output features. In the process herein, before training the deep CNN feature learning model and inputting the 3D model triangular facet feature into the deep CNN feature learning model, the 3D model triangular facet feature will be extracted and reconstructed, which enhances the capability to describe the 3D model triangular facet. And on this basis, the deep CNN feature learning model having the specific structure is combined to perform feature processing and classifying, thereby ensuring the accuracy of 3D model triangular facet feature learning and classifying results.

On the basis of the aforementioned embodiment, the present embodiment involves the process of extracting and reconstructing features of the 3D model triangular facet. This embodiment is explained by taking the feature extracting and reconstructing before training the deep CNN feature learning model as an example. In other words, this embodiment explains the particular process performed in S102. S104 is performed in a similar way as that of S102, except for that the 3D model triangular facet having the class label needs to be replaced by a 3D model triangular facet having no class label in the following steps.

Figure 4:
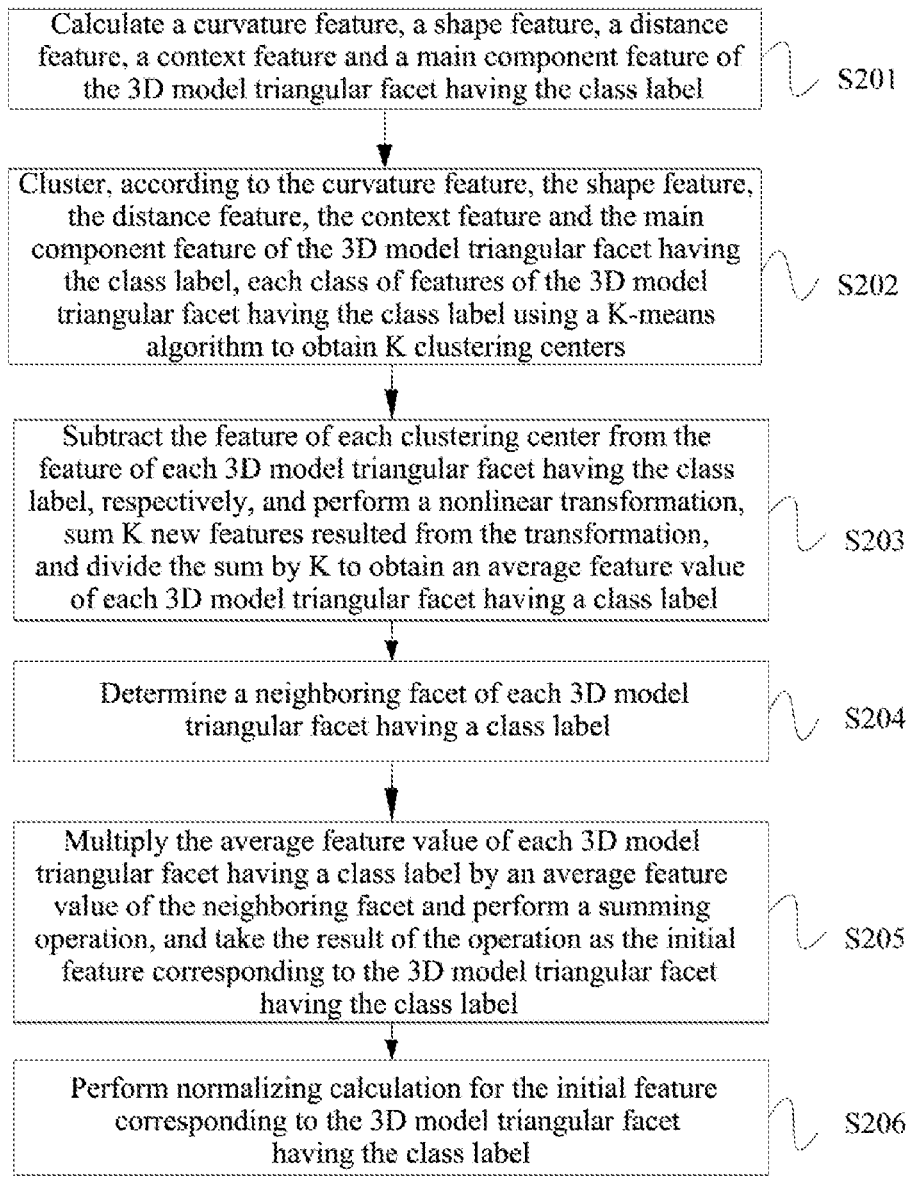
FIG. 4 is a flowchart illustrating a second embodiment of a deep learning based method for 3D model triangular facet feature learning and classifying provided herein.

FIG. 4 is a flowchart illustrating a second embodiment of a deep learning based method for 3D model triangular facet feature learning and classifying provided herein. As depicted in FIG. 4, the aforementioned step S102 particularly includes:

S201: calculate a curvature feature, a shape feature, a distance feature, a context feature and a main component feature of the 3D model triangular facet having the class label.

S202: cluster, according to the curvature feature, the shape feature, the distance feature, the context feature and the main component feature of the 3D model triangular facet having the class label, each class of features of the 3D model triangular facet having the class label using a K-means algorithm to obtain K clustering centers.

The aforementioned K is an integer greater than 0.

S203: subtract the feature of each clustering center from the feature of each 3D model triangular facet having a class label and perform a nonlinear transformation, sum K new features resulted from the transformation, and divide the sum by K to obtain an average feature value of each 3D model triangular facet having a class label.

Particularly, assuming that the result obtained by subtracting the feature of each clustering center from the feature of each 3D model triangular facet having a class label is Disk, the nonlinear transformation is performed on the Disk using the following formula:

$$NDisk=\exp(-Disk/kbof)$$

where kbof is a proportion factor, and kbof may be optionally set as 1e6.

S204: determine a neighboring facet of each 3D model triangular facet having a class label.

S205: multiply the average feature value of each 3D model triangular facet having a class label by an average feature value of the neighboring facet and perform a summing operation, and take the result of the operation as the initial feature corresponding to the 3D model triangular facet having the class label.

S206: perform normalizing calculation for the initial feature corresponding to the 3D model triangular facet having the class label.

Figure 5:
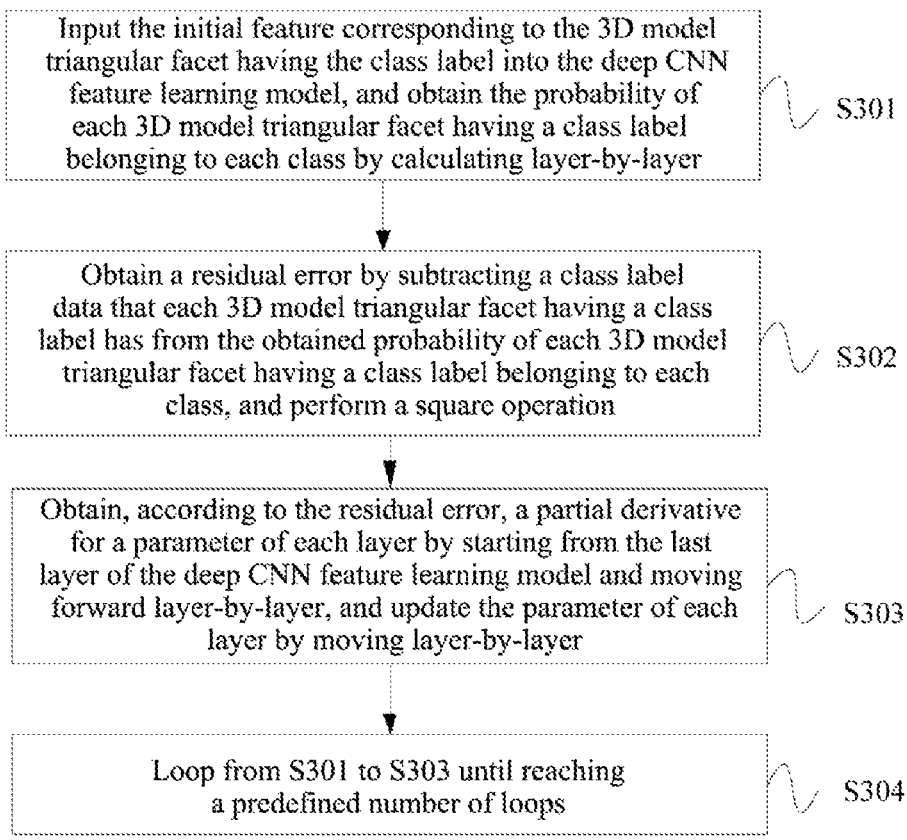
FIG. 5 is a flowchart illustrating a third embodiment of a deep learning based method for 3D model triangular facet feature learning and classifying provided herein.

On the basis of the aforementioned embodiments, the present embodiment involves the particular approach for training the deep CNN feature learning model. That is, as depicted in FIG. 5, which is a flowchart illustrating a third embodiment of a deep learning based method for 3D model triangular facet feature learning and classifying provided herein, the aforementioned step S103 particularly includes:

S301: input the initial feature corresponding to the 3D model triangular facet having the class label into the deep CNN feature learning model, and obtain the probability that each 3D model triangular facet having a class label belongs to each class by calculating layer-by-layer.

When training the deep CNN feature learning model, the primary parameters to be trained are a weight matrix W and an offset vector b.

The step involves a forward-conducting process, in which very small random numbers are used to initialize the weight matrix W, and a 0 vector is used to initialize the offset vector b. Further, the initial feature is inputted into the deep CNN feature learning model and goes through calculations layer-by-layer, thus obtaining the output feature of each triangular facet t and the probability $P_t$ of each triangular facet belonging to a different class.

S302: obtain a residual error by subtracting a class label data that each 3D model triangular facet having a class label has from the obtained probability of each 3D model triangular facet having a class label belonging to each class, and perform a square operation.

Assuming that $G_t$ represents ground-truth data, then the residual error is calculated based on Euclidean distance using the following formula:

$$Error_t = \sum_{t \in T} |G_t - P_t|^2$$

where T represents a set of all 3D mesh triangular facets employed in the training.

S303: obtain, according to the residual error, a partial derivative for a parameter of each layer by starting from the last layer of the deep CNN feature learning model and moving forward layer-by-layer, and update the parameter of each layer by moving layer-by-layer.

The step involves a backward-propagating process, which is performed for the purpose of reducing the residual error $Error_t$ by adjusting parameters W and b of each layer. Since Output=W*Input+b, the formula to calculate the partial derivative of the residual error $Error_t$ with respect to b is:

$$\nabla_{b^l} Error_t = \frac{\partial Error_t}{\partial Output} \frac{\partial Output}{\partial b} = \delta^l$$

and when backward-propagating from layer l+1 to layer l:

$$\delta^l = \begin{cases} (W^{l+1})\delta^{l+1} \cdot \text{sigmoid}'(Output^l), & \text{if } l \text{ is a "C" layer} \\ (W^{l+1})^T \delta^{l+1}, & \text{if } l \text{ is a "S" layer} \end{cases}$$

where "●" indicates multiplying corresponding elements, and "C" and "S" indicate convolutional operation and downsampling operation, respectively.

It should be noted that, the calculation for the residual error performed at the last layer, i.e. the layer L, differs slightly from those of other layers in that:

$$\delta^L = \text{sigmoid}'(Output^L) \cdot (G_t - P_t) = Output^L \cdot (1 - Output^L) \cdot (G_t - P_t)$$

Similar to the calculation for the partial derivative of the residual error $Error_t$ with respect to b, the formula to calculate the partial derivative of the residual error $Error_t$ with respect to W is:

$$\nabla_{W^l} Error_t = Input^l (\delta^l)^T = Output^{l-1} (\delta^l)^T$$

Finally, parameters of each layer are updated using the following formulas:

$$W^l = W^l - \alpha * \nabla_{W^l} Error_t$$

$$b^l = b^l - \alpha * \nabla_{b^l} Error_t$$

where 60 represents the learning rate. Optionally, a value of α may be set as 0.98.

S304: loop from S301 to S303 until reaching a predefined number of loops.

The aforementioned forward-conducting and backward-propagating process continue to iterate, until a predefined number of iterations is reached, i.e. the residual error converges.

Optionally, the number of iterations may be set according to the scale of the training set.

Figure 6:
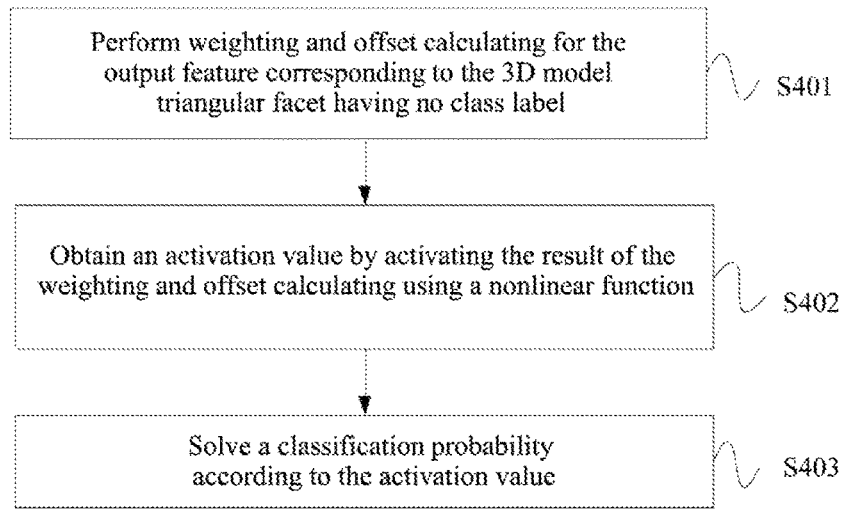
FIG. 6 is a flowchart illustrating a fourth embodiment of a deep learning based method for 3D model triangular facet feature learning and classifying provided herein.

On the basis of the aforementioned embodiments, the present embodiment involves the particular process of classifying the 3D model triangular facet. That is, as depicted in FIG. 6, which is a flowchart illustrating a fourth embodiment of a deep learning based method for 3D model triangular facet feature learning and classifying provided herein, the aforementioned step S106 particularly includes:

S401: perform weighting and offset calculating for the output feature corresponding to the 3D model triangular facet having no class label.

S402: obtain an activation value by activating the result of the weighting and offset calculating using a nonlinear function.

S403: solve a classification probability according to the activation value.

Figure 7:
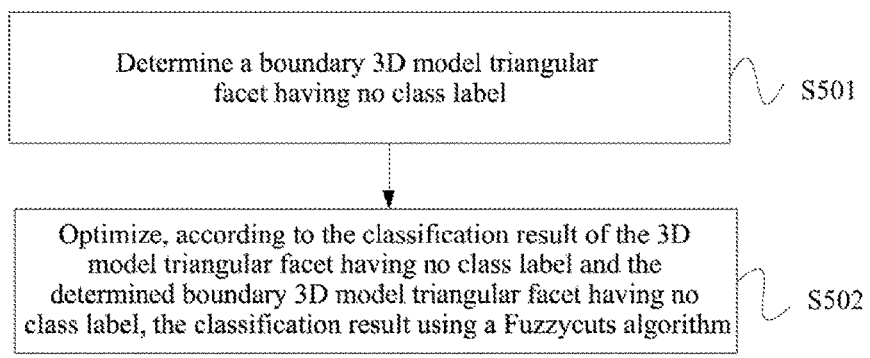
FIG. 7 is a flowchart illustrating a fifth embodiment of a deep learning based method for 3D model triangular facet feature learning and classifying provided herein.

FIG. 7 is a flowchart illustrating a fifth embodiment of a deep learning based method for 3D model triangular facet feature learning and classifying provided herein. As depicted in FIG. 7, after classifying the 3D model triangular facet having no class label, the method further includes:

S501: determine a boundary 3D model triangular facet having no class label.

S502: optimize, according to the classification result of the 3D model triangular facet having no class label and the determined boundary 3D model triangular facet having no class label, the classification result using a Fuzzycuts algorithm.

Figure 8:
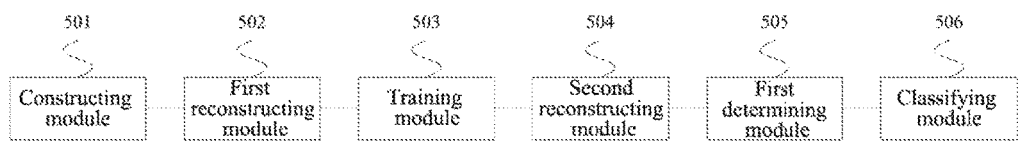
FIG. 8 is a modular structural diagram illustrating a first embodiment of a deep learning based apparatus for 3D model triangular facet feature learning and classifying provided herein.

FIG. 8 is a modular structural diagram illustrating a first embodiment of a deep learning based apparatus for 3D model triangular facet feature learning and classifying provided herein. As depicted in FIG. 8, the apparatus includes:

a constructing module 501, configured to construct a deep CNN feature learning model having a first convolution layer, a first downsampling layer, a second convolution layer and a second downsampling layer, where the first convolution layer has 16 convolution kernels, each of which has a dimension of 5×5, a scaling factor of the first downsampling layer is 2, the second convolution layer has 16×20 convolution kernels, each of which has a dimension of 3×3, and a scaling factor of the second downsampling layer is 2;

a first reconstructing module 502, configured to extract a feature from, and construct a feature vector for, a 3D model triangular facet having a class label, and reconstruct a feature in the feature vector so constructed using a bag-of-words algorithm to obtain an initial feature corresponding to the 3D model triangular facet having the class label;

a training module 503, configured to train the deep CNN feature learning model using the initial feature corresponding to the 3D model triangular facet having the class label to obtain a trained deep CNN feature learning model;

a second reconstructing module 504, configured to extract a feature from, and construct a feature vector for, a 3D model triangular facet having no class label, and reconstruct a feature in the feature vector so constructed using the bag-of-words algorithm to obtain an initial feature corresponding to the 3D model triangular facet having no class label;

a first determining module 505, configured to determine an output feature corresponding to the 3D model triangular facet having no class label according to the trained deep CNN feature learning model and the initial feature corresponding to the 3D model triangular facet having no class label; and a classifying module 506, configured to classify the 3D model triangular facet having no class label according to the output feature corresponding to the 3D model triangular facet having no class label.

The apparatus is configured to implement the aforementioned method embodiments following similar principles and producing similar technical effects, which will not be repeated herein.

Figure 9:
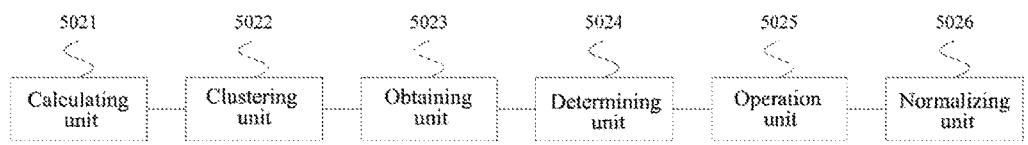
FIG. 9 is a modular structural diagram illustrating a second embodiment of a deep learning based apparatus for 3D model triangular facet feature learning and classifying provided herein.

FIG. 9 is a modular structural diagram illustrating a second embodiment of a deep learning based apparatus for 3D model triangular facet feature learning and classifying provided herein. As depicted in FIG. 9, the first reconstructing module 502 includes:

a calculating unit 5021, configured to calculate a curvature feature, a shape feature, a distance feature, a context feature and a main component feature of the 3D model triangular facet having the class label;

a clustering unit 5022, configured to cluster, according to the curvature feature, the shape feature, the distance feature, the context feature and the main component feature of the 3D model triangular facet having the class label, each class of features of the 3D model triangular facet having the class label using a K-means algorithm to obtain K clustering centers, where K is an integer greater than 0;

an obtaining unit 5023, configured to subtract the feature of each clustering center from the feature of each 3D model triangular facet having a class label, respectively, and perform a nonlinear transformation, sum K new features resulted from the transformation, and divide the sum by K to obtain an average feature value of each 3D model triangular facet having a class label;

a determining unit 5024, configured to determine a neighboring facet of each 3D model triangular facet having a class label;

an operation unit 5025, configured to multiply the average feature value of each 3D model triangular facet having a class label by an average feature value of the neighboring facet and perform a summing operation, and take the result of the operation as the initial feature corresponding to the 3D model triangular facet having the class label; and a normalizing unit 5026, configured to perform normalizing calculation for the initial feature corresponding to the 3D model triangular facet having the class label.

Figure 10:
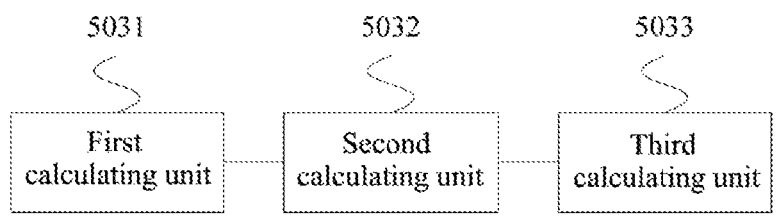
FIG. 10 is a modular structural diagram illustrating a third embodiment of a deep learning based apparatus for 3D model triangular facet feature learning and classifying provided herein.

FIG. 10 is a modular structural diagram illustrating a third embodiment of a deep learning based apparatus for 3D model triangular facet feature learning and classifying provided herein. As depicted in FIG. 10, the training module 503 includes:

a first calculating unit 5031, configured to input the initial feature corresponding to the 3D model triangular facet having the class label into the deep CNN feature learning model, and obtain the probability of each 3D model triangular facet having a class label belonging to each class by calculating layer-by-layer;

a second calculating unit 5032, configured to obtain a residual error by subtracting a class label data that each 3D model triangular facet having a class label has from the obtained probability of each 3D model triangular facet having a class label belonging to each class, and perform a square operation; and a third calculating unit 5033, configured to obtain, according to the residual error, a partial derivative for a parameter of each layer by starting from the last layer of the deep CNN feature learning model and moving forward layer-by-layer, and update the parameter of each layer by moving layer-by-layer.

Figure 11:
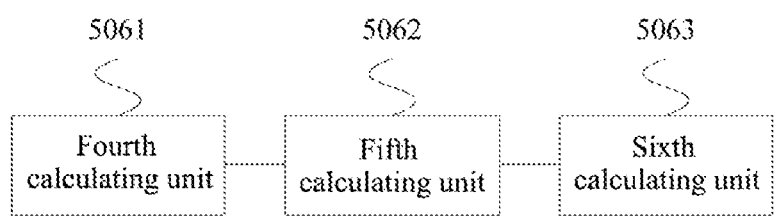
FIG. 11 is a modular structural diagram illustrating a fourth embodiment of a deep learning based apparatus for 3D model triangular facet feature learning and classifying provided herein.

FIG. 11 is a modular structural diagram illustrating a fourth embodiment of a deep learning based apparatus for 3D model triangular facet feature learning and classifying provided herein. As depicted in FIG. 11, the classifying module 506 includes:

a fourth calculating unit 5061, configured to perform weighting and offset calculating for the output feature corresponding to the 3D model triangular facet having no class label;

a fifth calculating unit 5062, configured to obtain an activation value by activating the result of the weighting and offset calculating using a nonlinear function; and a sixth calculating unit 5063, configured to solve a classification probability according to the activation value.

Figure 12:
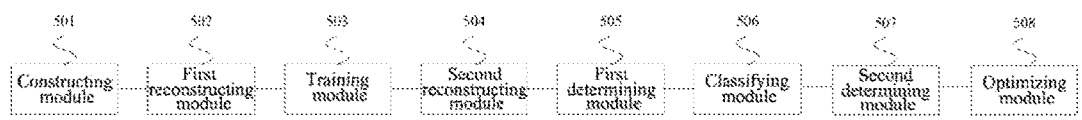
FIG. 12 is a modular structural diagram illustrating a fifth embodiment of a deep learning based apparatus for 3D model triangular facet feature learning and classifying provided herein.

FIG. 12 is a modular structural diagram illustrating a fifth embodiment of a deep learning based apparatus for 3D model triangular facet feature learning and classifying provided herein. As depicted in FIG. 12, the apparatus further includes:

a second determining module 507, configured to determine a boundary 3D model triangular facet having no class label; and an optimizing module 508, configured to optimize, according to a classification result of the 3D model triangular facet having no class label and the determined boundary 3D model triangular facet having no class label, the classification result using a Fuzzycuts algorithm.

Persons of ordinary skill in the art may understand that, all or a part of steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as a ROM, a RAM, a magnetic disk, or an optical disc.

Finally, it should be noted that the foregoing embodiments are merely intended for describing, rather than limiting, the technical solutions of the present invention. Although the present invention is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present invention.

What is claimed is:

1. A deep learning based method for three dimensional (3D) model triangular facet feature learning and classifying, comprising:
    constructing a deep convolutional neural network (CNN) feature learning model having a first convolution layer, a first downsampling layer, a second convolution layer and a second downsampling layer, wherein the first convolution layer has 16 convolution kernels, each of which has a dimension of 5×5, a scaling factor of the first downsampling layer is 2, the second convolution layer has 16×20 convolution kernels, each of which has a dimension of 3×3, and a scaling factor of the second downsampling layer is 2;
    extracting a feature from a 3D model triangular facet having a class label and constructing a feature vector for the 3D model triangular facet having the class label, and reconstructing a feature in the constructed feature vector using a bag-of-words algorithm to obtain an initial feature corresponding to the 3D model triangular facet having the class label;
    training the deep CNN feature learning model using the initial feature corresponding to the 3D model triangular facet having the class label to obtain a trained deep CNN feature learning model;
    extracting a feature from a 3D model triangular facet having no class label and constructing a feature vector for the 3D model triangular facet having no class label, and reconstructing a feature in the constructed feature vector using the bag-of-words algorithm to obtain an initial feature corresponding to the 3D model triangular facet having no class label;
    determining an output feature corresponding to the 3D model triangular facet having no class label according to the trained deep CNN feature learning model and the initial feature corresponding to the 3D model triangular facet having no class label; and
    classifying the 3D model triangular facet having no class label according to the output feature corresponding to the 3D model triangular facet having no class label.

2. The method according to claim 1, wherein the extracting a feature from a 3D model triangular facet having a class label and constructing a feature vector for the 3D model triangular facet having the class label, and reconstructing a feature in the constructed feature vector using a bag-of-words algorithm to obtain an initial feature corresponding to the 3D model triangular facet having the class label comprises:
    calculating a curvature feature, a shape feature, a distance feature, a context feature and a main component feature of the 3D model triangular facet having the class label;
    clustering, according to the curvature feature, the shape feature, the distance feature, the context feature and the main component feature of the 3D model triangular facet having the class label, each class of features of the 3D model triangular facet having the class label using a K-means algorithm to obtain K clustering centers, wherein K is an integer greater than 0;
    subtracting a feature of each of the clustering centers from a feature of each 3D model triangular facet having a class label, respectively, and performing a nonlinear transformation, summing K new features resulted from the transformation, and dividing the sum by K to obtain an average feature value of each 3D model triangular facet having a class label;
    determining a neighboring facet of each 3D model triangular facet having a class label;
    multiplying the average feature value of each 3D model triangular facet having a class label by an average feature value of the neighboring facet and performing a summing operation, and taking a result of the operation as the initial feature corresponding to the 3D model triangular facet having the class label; and
    performing normalizing calculation for the initial feature corresponding to the 3D model triangular facet having the class label.

3. The method according to claim 1, wherein the training the deep CNN feature learning model using the initial feature corresponding to the 3D model triangular facet having the class label to obtain a trained deep CNN feature learning model comprises:
    A, inputting the initial feature corresponding to the 3D model triangular facet having the class label into the deep CNN feature learning model, and obtaining a probability of each 3D model triangular facet having a class label belonging to each class by calculating layer-by-layer;
    B, obtaining a residual error by subtracting a class label data that each 3D model triangular facet having a class label has from the obtained probability of each 3D model triangular facet having a class label belonging to each class and performing a square operation;
    C, obtaining, according to the residual error, a partial derivative for a parameter of each layer by starting from a last layer of the deep CNN feature learning model and moving forward layer-by-layer, and updating the parameter of each layer by moving layer-by-layer; and
    D, looping from A to C until reaching a predefined number of loops.

4. The method according to claim 1, wherein the classifying the 3D model triangular facet having no class label according to the output feature corresponding to the 3D model triangular facet having no class label comprises:
    performing weighting and offset calculating for the output feature corresponding to the 3D model triangular facet having no class label;
    obtaining an activation value by activating a result of the weighting and offset calculating using a nonlinear function; and
    solving a classification probability according to the activation value.

5. The method according to claim 1, further comprising:
    determining a boundary 3D model triangular facet having no class label; and
    optimizing, according to a classification result of the 3D model triangular facet having no class label and the determined boundary 3D model triangular facet having no class label, the classification result using a Fuzzy-cuts algorithm.

6. A deep learning based apparatus for three dimensional (3D) model triangular facet feature learning and classifying, comprising:
    a constructing module, configured to construct a deep convolutional neural network (CNN) feature learning model having a first convolution layer, a first downsampling layer, a second convolution layer and a second downsampling layer, wherein the first convolution layer has 16 convolution kernels, each of which has a dimension of 5×5, a scaling factor of the first downsampling layer is 2, the second convolution layer has 16×20 convolution kernels, each of which has a dimension of 3×3, and a scaling factor of the second downsampling layer is 2;

a first reconstructing module, configured to extract a feature from a 3D model triangular facet having a class label and construct a feature vector for the 3D model triangular facet having the class label, and reconstruct a feature in the constructed feature vector using a bag-of-words algorithm to obtain an initial feature corresponding to the 3D model triangular facet having the class label;

a training module, configured to train the deep CNN feature learning model using the initial feature corresponding to the 3D model triangular facet having the class label to obtain a trained deep CNN feature learning model;

a second reconstructing module, configured to extract a feature from a 3D model triangular facet having no class label and construct a feature vector for the 3D model triangular facet having no class label, and reconstruct a feature in the constructed feature vector using the bag-of-words algorithm to obtain an initial feature corresponding to the 3D model triangular facet having no class label;

a first determining module, configured to determine an output feature corresponding to the 3D model triangular facet having no class label according to the trained deep CNN feature learning model and the initial feature corresponding to the 3D model triangular facet having no class label; and a classifying module, configured to classify the 3D model triangular facet having no class label according to the output feature corresponding to the 3D model triangular facet having no class label.

7. The apparatus according to claim 6, wherein the first reconstructing module comprises:

a calculating unit, configured to calculate a curvature feature, a shape feature, a distance feature, a context feature and a main component feature of the 3D model triangular facet having the class label;

a clustering unit, configured to cluster, according to the curvature feature, the shape feature, the distance feature, the context feature and the main component feature of the 3D model triangular facet having the class label, each class of features of the 3D model triangular facet having the class label using a K-means algorithm to obtain K clustering centers, wherein K is an integer greater than 0;

an obtaining unit, configured to subtract a feature of each of the clustering centers from a feature of each 3D model triangular facet having a class label, respectively, and perform a nonlinear transformation, sum K new features resulted from the transformation, and divide the sum by K to obtain an average feature value of each 3D model triangular facet having a class label;

a determining unit, configured to determine a neighboring facet of each 3D model triangular facet having a class label;

an operation unit, configured to multiply the average feature value of each 3D model triangular facet having a class label by an average feature value of the neighboring facet and perform a summing operation, and take a result of the operation as the initial feature corresponding to the 3D model triangular facet having the class label; and a normalizing unit, configured to perform normalizing calculation for the initial feature corresponding to the 3D model triangular facet having the class label.

8. The apparatus according to claim 6, wherein the training module comprises:

a first calculating unit, configured to input the initial feature corresponding to the 3D model triangular facet having the class label into the deep CNN feature learning model, and obtain a probability of each 3D model triangular facet having a class label belonging to each class by calculating layer-by-layer;

a second calculating unit, configured to obtain a residual error by subtracting a class label data that each 3D model triangular facet having a class label has from the obtained probability of each 3D model triangular facet having a class label belonging to each class, and perform a square operation; and a third calculating unit, configured to obtain, according to the residual error, a partial derivative for a parameter of each layer by starting from a last layer of the deep CNN feature learning model and moving forward layer-by-layer, and update the parameter of each layer by moving layer-by-layer.

9. The apparatus according to claim 6, wherein the classifying module comprises:

a fourth calculating unit, configured to perform weighting and offset calculating for the output feature corresponding to the 3D model triangular facet having no class label;

a fifth calculating unit, configured to obtain an activation value by activating a result of the weighting and offset calculating using a nonlinear function; and a sixth calculating unit, configured to solve a classification probability according to the activation value.

10. The apparatus according to claim 6, further comprising:

a second determining module, configured to determine a boundary 3D model triangular facet having no class label; and an optimizing module, configured to optimize, according to a classification result of the 3D model triangular facet having no class label and the determined boundary 3D model triangular facet having no class label, the classification result using a Fuzzycuts algorithm.

* * * * *